United States Patent
Jin et al.

(10) Patent No.: US 12,155,524 B2
(45) Date of Patent: Nov. 26, 2024

(54) METHOD FOR PROVIDING HIGH AVAILABILITY SERVICE THROUGH GNB REALLOCATION AND DEVICE THEREFOR

(71) Applicant: Samsung Electronics Co., Ltd., Suwon-si (KR)

(72) Inventors: Kwangduk Jin, Suwon-si (KR); Daejoong Kim, Suwon-si (KR); Hyunho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/626,291

(22) PCT Filed: Jul. 6, 2020

(86) PCT No.: PCT/KR2020/008788
§ 371 (c)(1),
(2) Date: Jan. 11, 2022

(87) PCT Pub. No.: WO2021/010632
PCT Pub. Date: Jan. 21, 2021

(65) Prior Publication Data
US 2022/0271990 A1 Aug. 25, 2022

(30) Foreign Application Priority Data

Jul. 12, 2019 (KR) .................. 10-2019-0084788
Oct. 17, 2019 (KR) .................. 10-2019-0129227

(51) Int. Cl.
*H04L 41/0659* (2022.01)
*H04L 41/0663* (2022.01)

(52) U.S. Cl.
CPC ...... *H04L 41/0661* (2023.05); *H04L 41/0663* (2013.01)

(58) Field of Classification Search
None
See application file for complete search history.

(56) References Cited

U.S. PATENT DOCUMENTS 9,246,761 B2 * 1/2016 Lee .................. H04L 41/0869
10,205,806 B2 2/2019 Gong et al.
(Continued)

FOREIGN PATENT DOCUMENTS

KR 10-2010-0108740 A 10/2010
KR 10-2015-0021649 A 3/2015
KR 10-2021-0007788 A 1/2021

OTHER PUBLICATIONS

International Telecommunication Union (ITU), 'Transport network support of IMT-2020/5G', GSTR-TN5G, ITU-T Technical Report, Oct. 19, 2018 [retrieved on Sep. 17, 2020]. Retrieved from the Internet: <URL: https://www.itu.int/pub/T-TUT-HOME-2018-2>.

(Continued)

*Primary Examiner* — Kodzovi Acolatse
*Assistant Examiner* — Anindita Sen
(74) *Attorney, Agent, or Firm* — Jefferson IP Law, LLP (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

10 Claims, 11 Drawing Sheets

(56) References Cited

U.S. PATENT DOCUMENTS

| | | | | |
|---|---|---|---|---|
| 11,477,712 | B2* | 10/2022 | Hsieh | H04W 36/0055 |
| 2018/0322022 | A1* | 11/2018 | Garlapati | G06F 11/1658 |
| 2019/0104458 | A1* | 4/2019 | Svennebring | H04L 45/42 |
| 2019/0215756 | A1* | 7/2019 | Park | H04W 76/19 |
| 2019/0342800 | A1* | 11/2019 | Sirotkin | H04B 17/318 |
| 2020/0275340 | A1* | 8/2020 | Kim | H04W 36/00835 |
| 2020/0396760 | A1* | 12/2020 | Yi | H04L 1/1812 |
| 2021/0022024 | A1* | 1/2021 | Yao | H04W 36/0085 |
| 2022/0201777 | A1* | 6/2022 | Teyeb | H04L 45/302 |

OTHER PUBLICATIONS

Huawei, 'Discussion on the gNB-DU behaviour upon RLC failure', R3-190605, 3GPP TSG-RAN WG3 #103, Athens, Greece, Feb. 15, 2019.

European Office Action dated Oct. 20, 2023, issued in European Application No. 20 839 770.3—1216.

European Office Communication dated Mar. 23, 2023, issued in European Application No. 20 839 770.3.

China Mobile, "pCR TR 28.802 Add SON automated healing functionality for gNB in 5G-RAN," S5-175285, Oct. 15, 2017.

ETSI, "Network Functions Virtualisation (NFV); Resiliency Requirements," ETSI GS NFV-REL 001 V1.1.1, Jan. 2015.

Jaro et al., "Evolution towards Telco—Cloud: Reflections on Dimensioning, Availability and Operability," Jul. 1, 2019.

Extended European Search Report dated Jul. 11, 2022, issued in European Patent Application No. 20839770.3.

European Office Action dated May 21, 2024, issued in European Patent Application No. 20 839 770.3.

Korean Office Action dated Jan. 30, 2024, issued in Korean Patent Application No. 10-2019-0129227.

Indian Notice of Hearing dated Sep. 25, 2024, issued in Indian Application No. 202217001781.

* cited by examiner

| | HA Cluster Group ID | DC_ID | gNB-CU_ID | Logical gNB_ID | Cell Count | gNB status | Availability Cell Count |
|---|---|---|---|---|---|---|---|
| gNB-CU-HA Management List | A | 1 | 1 | 1 | 120 | Activation | 1500 |
| | | | | 2 | 150 | Activation | |
| | | | | 3 | 200 | Activation | |
| | | | | 4 | 50 | Activation | |
| | | | 2 | 15 | 500 | Activation | 1400 |
| | | | | 16 | 100 | Activation | |
| | | | 3 | 18 | 350 | Activation | 1800 |
| | | 2 | 4 | 21 | 600 | Activation | 1200 |
| | | | | 22 | 50 | Activation | |
| | | | | 23 | 120 | Activation | |
| | | | 5 | 30 | 60 | Activation | 1600 |
| | | | | 31 | 150 | Activation | |
| | | | | 32 | 170 | Activation | |
| | | | 6 | 40 | 75 | Activation | 1900 |
| | | | | 41 | 165 | Activation | |
| | ⋮ | ⋮ | ⋮ | ⋮ | ⋮ | ⋮ | ⋮ |

METHOD FOR PROVIDING HIGH AVAILABILITY SERVICE THROUGH GNB REALLOCATION AND DEVICE THEREFOR

TECHNICAL FIELD

The disclosure provides a method for providing high availability (HA) that detects a failure of a gNB-CU composed of virtualized network functions (VNFs) and rapidly relocates the gNB-CU to an adjacent gNB-CU to restore normal operation in case of a disaster such as an earthquake or a large-scale power outage, and a device therefor. In addition, by forming an HA cluster group, resource utilization of gNB-CUs in the group is monitored and the service is resumed using a gNB-CU with available resources, thereby increasing resource utilization. That is, it is possible to save the capital expenditure (CAPEX) and the operational expenditure (OPEX) as there is no need to configure the standby side for failure and disaster recovery. Further, by storing data externally in real time, it is possible to provide the up-to-date recovery point object (RPO) when the service is restored.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The service recovery function for network device can ensure service continuity after a severe failure and a disaster such as an earthquake or large-scale power outage that make the network device or the data center in which the network device are placed unserviceable. In some known related-art techniques, a standby side is configured in preparation for failure and the operating service is transferred and restored or resumed in the event of a failure; or the orchestrator detects a failure in a network function virtualization (NFV) environment and restores the service by additionally creating a VNF to which the service of the failed device is to be transferred.

A problem of the related-art technique described above is that unnecessary CAPEX (capital expenditure) and OPEX (operational expenditure) costs increase due to resources on the standby side that are not serviced and on standby. Also, service recovery through virtualized network function (VNF) creation in a network function virtualization (NFV) environment has a problem in that the recovery time object (RTO) increases due to an increase in recovery time according to the additional creation.

Solution to Problem

The technical objectives to be achieved in the embodiments of the disclosure are not limited to those mentioned above, and other technical objectives not mentioned will be clearly understood by those of ordinary skill in the art to which the disclosure pertains from the following description.

In the disclosure for solving the above problems, a method of a high availability service management device in a wireless communication system may include: receiving a message including information on service status from a first base station; determining whether a service failure has occurred in the first base station based on the message; and relocating entities in the first base station to an adjacent base station based on the determination, wherein the first base station may be composed of a plurality of entities.

In some examples, relocating entities in the first base station may include relocating the entities preferentially to an adjacent base station present in the same data center as the first base station.

In some examples, determining whether a service failure has occurred in the first base station may include: checking whether a service failure has occurred via the adjacent base station; and determining whether a service failure has occurred in the first base station based on a check result.

In some examples, the method may further include: checking whether the first base station has been recovered from the service failure; and relocating, in case that the first base station has been recovered from the service failure, the entities in the first base station back to the first base station according to a configured mode.

In some examples, the method may further include: receiving a high availability service management device registration request from the first base station; and transmitting, to the first base station, a response to high availability service management device registration based on the registration request.

In some examples, the information on service status may include at least one of information about the plurality of entities, the number of operated cells, or a service operation state.

In another example of the disclosure, a method of a first base station may include transmitting a message including information on service status to a high availability service management device, wherein whether a service failure has occurred in the first base station is determined based on the message, and entities in the first base station are relocated to an adjacent base station based on the determination, and wherein the first base station may be composed of a plurality of entities.

In another example of the disclosure, a high availability service management device may include: a transceiver capable of transmitting and receiving at least one signal; and a controller coupled to the transceiver, wherein the controller may be configured to: receive a message including information on service status from a first base station; determine whether a service failure has occurred in the first base station based on the message; and relocate entities in the first base station to an adjacent base station based on the determination, wherein the first base station may be composed of a plurality of entities.

In another example of the disclosure, a first base station may include: a transceiver capable of transmitting and receiving at least one signal; and a controller coupled to the transceiver, wherein the controller may be configured to transmit a message including information on service status to a high availability service management device, wherein whether a service failure has occurred in the first base station is determined based on the message, and entities in the first base station are relocated to an adjacent base station based on the determination, and wherein the first base station may be composed of a plurality of entities.

Advantageous Effects of Invention

The disclosure is to solve the above-described problems, and an object of the disclosure is to provide a rapid recovery service with the latest data before the failure occurrence without on-standby resources or additional resource creation by allowing all constituent gNB-CUs to operate in active states, grouping the gNB-CUs and data centers in operation into clusters to form HA cluster groups for managing gNB-CU resources, and performing recovery using an adjacent gNB-CU whose resource availability has been checked in the event of a failure.

Another object of the disclosure is to prepare for a single gNB-CU failure and a disaster such as an earthquake or a large-scale power outage by not fixing the target to be restored. That is, it is possible to provide recovery flexibility by preferentially relocating, in the event of a single gNB-CU failure, the logical gNB to an adjacent gNB-CU within the data center (intra data center) to thereby minimize the latency between the gNB-CU and the gNB-DU due to the gNB-CU change, and by performing, in the event of a large-scale failure due to a disaster, recovery using another adjacent data center.

According to the disclosure, it is possible to secure recovery flexibility with not fixing the recovery target by detecting in advance failure or disaster events through a separate device (ex. high availability (HA) controller, HAC) that monitors the states of gNB-CUs and data centers in real time, rapidly relocating logical gNBs, and relocating, in the event of a single gNB-CU failure, the logical gNBs first to gNB-CUs in the same data center or to gNB-CUs in an adjacent data center. In addition, even in the event of a disaster that causes a data center to be inoperable, through the same mechanism, logical gNBs in the corresponding data center are distributed and relocated to adjacent data centers, so that there is no need for resources on the standby side, and it is possible to manage multiple data centers by grouping them into clusters.

Accordingly, CAPEX (capital expenditure) can be saved as there is no need to create resources to be on standby, OPEX (operational expenditure) can be saved as all gNB-CUs are operated in active states, and high availability can be efficiently secured by shortening the recovery time objective (RTO) through early detection of failure and disaster events and rapid resumption of the service.

MODE FOR THE INVENTION

To achieve the above-mentioned objects, HA cluster groups may be formed to manage gNB-CUs and data centers as clusters, and a device may be configured to manage the resources of gNB-CUs and specify a service recovery target.

The device configured for this may monitor gNB-CU resources in real time, detect a failure and a large-scale disaster through status monitoring, and specify a logical gNB recovery target by utilizing the resources of adjacent operating gNB-CUs.

The gNB-CU serving as the recovery target to which the logical gNB of the failed gNB-CU is to be transferred may obtain the latest data of the failed gNB-CU from an external database system, restore the configuration data, and resume the service by reconnecting to adjacent peers based on the corresponding data.

Hereinafter, embodiments of the disclosure will be described in detail with reference to the accompanying drawings.

In the following description of embodiments, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Those terms used in the following description for indicating signals, indicating control information, indicating network entities, indicating components of an apparatus, and the like are taken as illustration for ease of description. Accordingly, the disclosure is not limited by the terms to be described later, and other terms having equivalent technical meanings may be used.

In addition, although the disclosure describes various embodiments by using terms used in some standards (e.g., ETSI), this is only an illustration for description. Various embodiments of the disclosure may be applied to other communication systems with minor modifications.

Various embodiments of the disclosure provide a device that rapidly detects a failure or disaster event through a separate device that monitors the states of gNB-CUs and data centers in real time, and controls prompt relocation of logical gNBs. In addition, it is possible to provide data operation continuity by providing a device that recovers data after relocation of logical gNBs.

Figure 1:
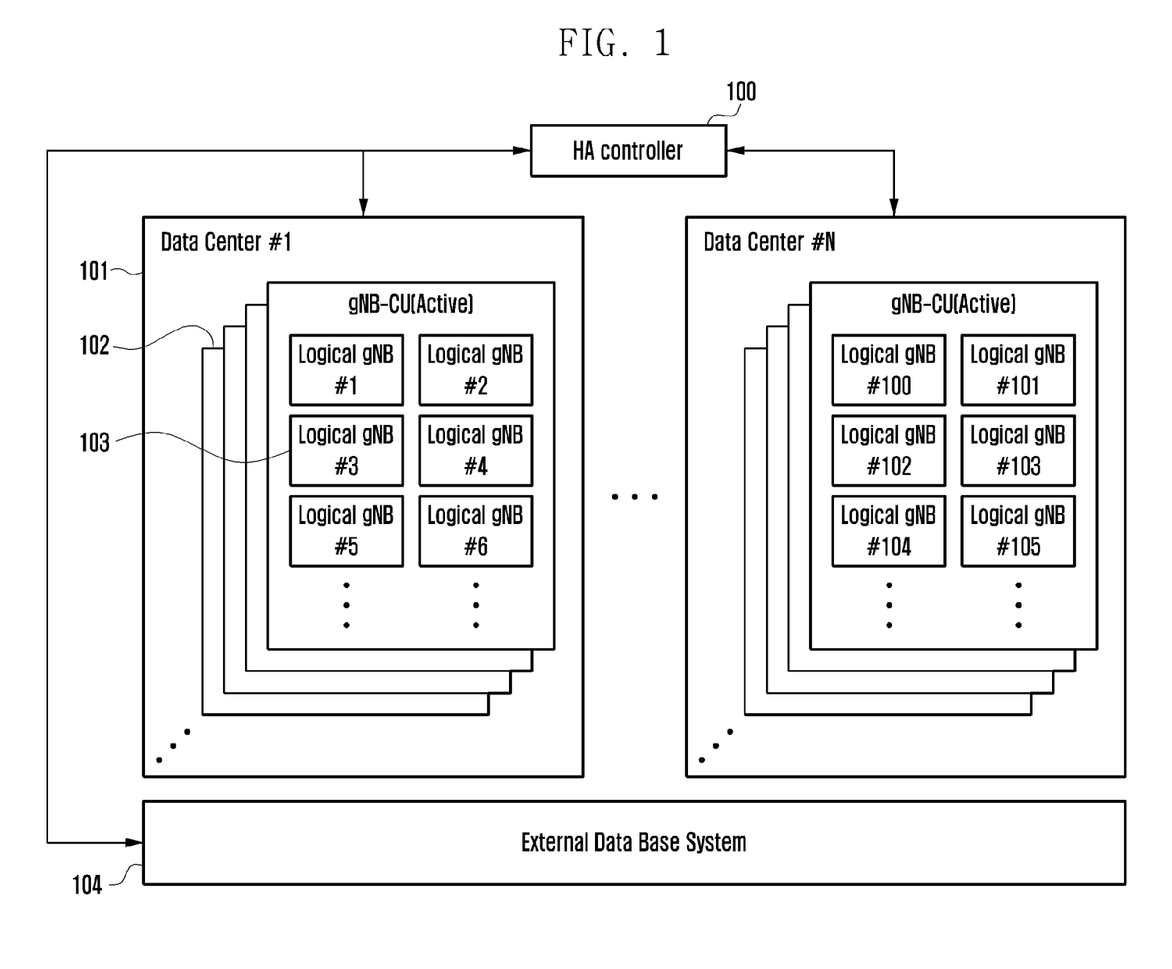
FIG. 1 is a diagram illustrating a configuration for supporting high availability through gNB-CUs and an HA controller in data centers according to an embodiment of the disclosure.

FIG. 1 is a diagram illustrating a configuration for supporting high availability through gNB-CUs and an HA controller in data centers according to an embodiment of the disclosure.

Specifically, FIG. 1 shows a service configuration of gNB-CUs 102 arranged in each data center 101 and logical gNBs 103 in each gNB-CU 102 according to some embodiments, and illustrates a high availability (HA) controller (hereinafter referred to as HAC) 100, which is a device that monitors the status of each gNB-CU 102 and managing HA.

In the configuration shown in FIG. 1, only the components related to this embodiment are shown. Hence, a person skilled in the art related to this embodiment can understand that general-purpose components other than the components shown in FIG. 1 may be further included.

FIG. 1 shows gNB-CUs 102 arranged in the data center 101, logical gNBs 103 configured therein, and the configuration of the HAC 100 that manages HA for the gNB-CUs 102. With reference to FIG. 1, the gNB-CUs 102 arranged in the data center 101 may each be operated in an active state. That is, separate resources in a standby state are not needed for HA.

In addition, each logical gNB 103 configured inside the gNB-CU 102 is implemented with one or more gNBs. gNB may be a new base station being next generation NodeB that supports interworking between the 5G new radio technology and the standalone (SA) core, and logical gNB 103 may refer to a function that implements the gNB in software to provide a service.

Accordingly, the user operates all gNB-CUs 102 in an active state; and even if a failure occurs in one gNB-CU 102, the logical gNB 103 being serviced is relocated to an adjacent gNB-CU 102, so that service recovery can be performed without the need for resources remaining in a standby state.

According to an embodiment of the disclosure, the HAC 100 is configured to manage monitoring and HA management for individual gNB-CUs 102.

Figure 2:
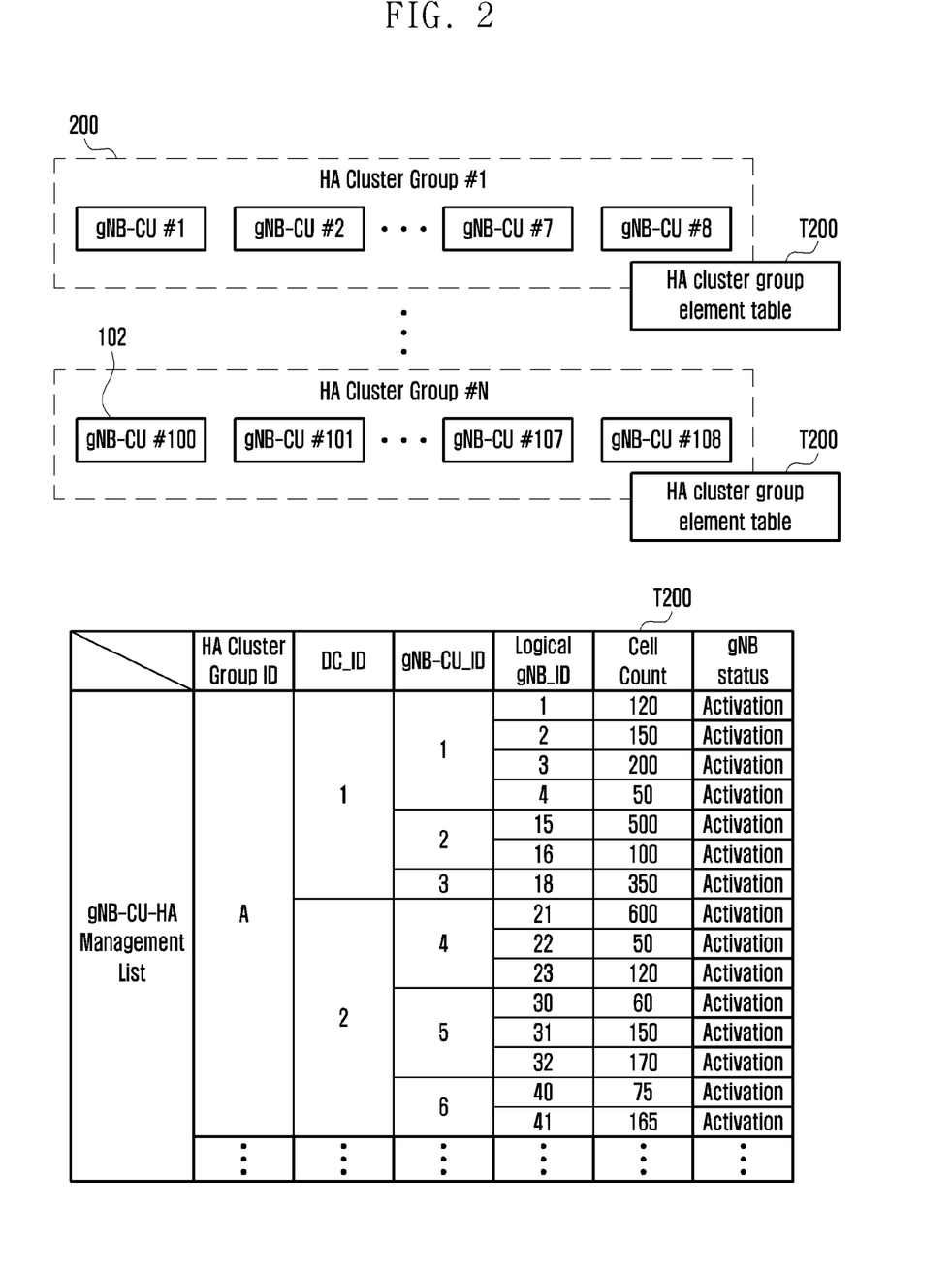
FIG. 2 is a diagram illustrating HA cluster groups and a management list for gNB-CUs in the HA controller according to an embodiment of the disclosure.

FIG. 2 is a diagram illustrating formation of HA cluster groups 200 of gNB-CUs 102 and a cell resource management table T200 of the gNB-CUs 102 corresponding to the formation according to some embodiments.

The table T200 shown in FIG. 2 illustrates only the components related to this embodiment. Hence, the components shown in FIG. 2 may be included in other procedures related to this embodiment.

The table T200 shown in FIG. 2 may include elements for state monitoring and resource monitoring of gNB-CUs 102.

"HA Cluster Group" shown in the table T200 indicates a bundle of gNB-CUs 102 for which the HAC 100 will manage HA, and is an item that enables management of recoverable targets through status detection and resource monitoring of the gNB-CUs 102 within the corresponding group.

"DC_ID" shown in the table T200 indicates an ID for identifying a data center 101 in which gNB-CUs 102 are arranged, and is an item that allows the intra DC to be first selected as the recovery target when a gNB-CU 102 fails. That is, this item enables relocation of a logical gNB 103 to a gNB-CU 102 belonging to the same data center 101 as the failed gNB-CU 102, which prevents latency from increasing as the distance between the gNB-CU 102 and the DU is increased.

"Cell Count" in the table T200 indicates the count of cells currently operated in a gNB-CU 102.

Specifically, the maximum number of operated cells per gNB-CU 102 may be defined and the number of currently operated cells may be managed in comparison to the maximum number of operated cells, which can be a factor for determining whether a specific gNB-CU 102 can be a recovery target.

"gNB Status" in the table T200 is an element that identifies the service status of a logical gNB 103 in the gNB-CU 102.

Figure 3:
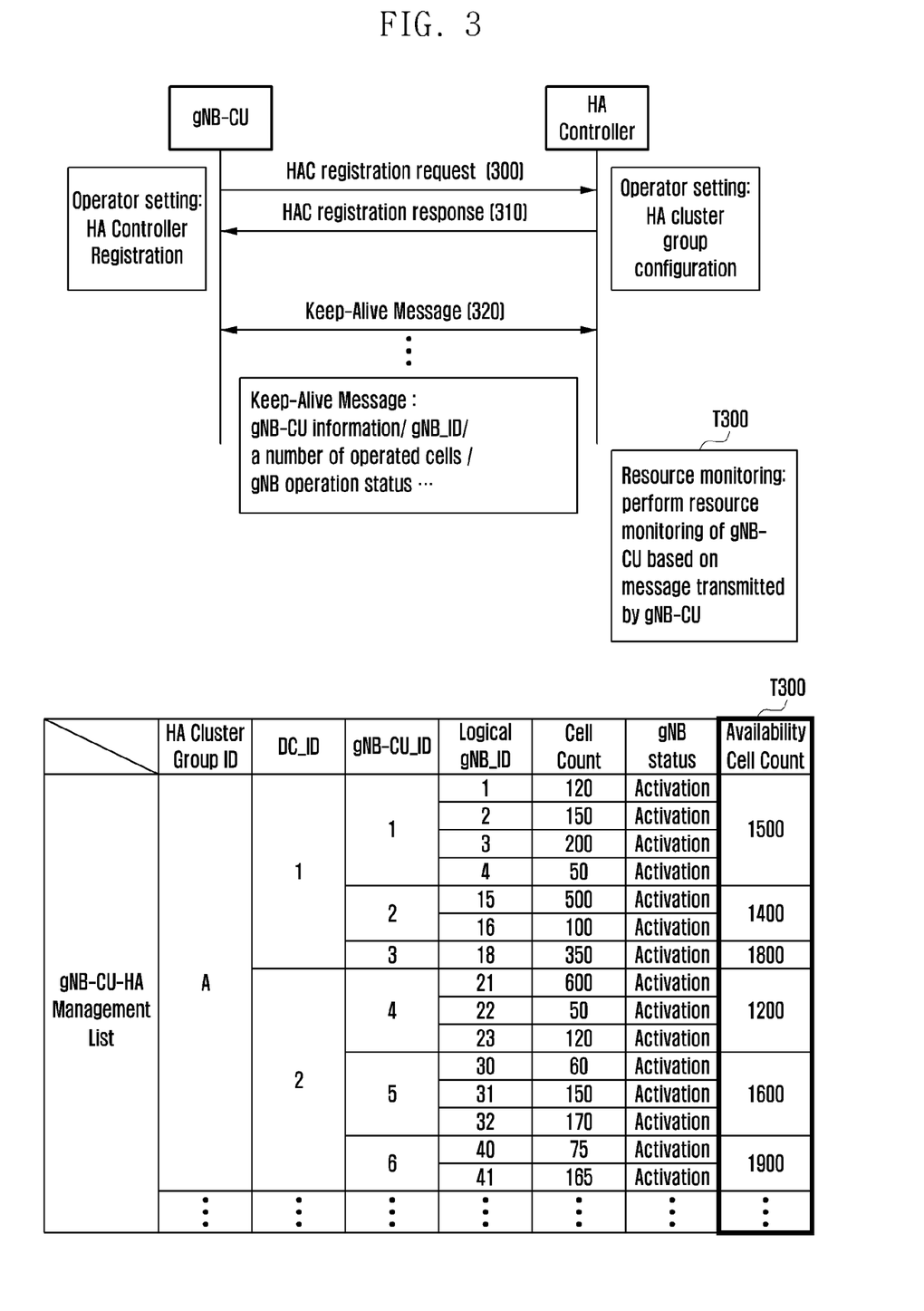
FIG. 3 is a diagram illustrating cell resource monitoring of a gNB-CU according to an embodiment of the disclosure.

FIG. 3 is a diagram illustrating a process of interworking, state detection, and message transfer between the gNB-CU 102 and the HAC 100 according to some embodiments.

When the operator configures a gNB-CU 102 and the HAC 100 as a management target, the gNB-CU 102 may transmit a HAC registration request via a transmission control protocol (TCP) message (300), and the HAC 100 may compose a HA management list and then transmit a HAC registration response to the gNB-CU 102 (310).

Upon receiving the response, the gNB-CU 102 may transmit the HAC 100 a message including contents such as its logical gNB information, the number of operated cells, and service operation states (320). This message may be referred to as a keep-alive message (320).

Upon receiving information about the gNB-CU 102 through the keep-alive message (320), the HAC 100 may monitor the available cell resources in each gNB-CU 102 (T300).

Specifically, if the maximum number of available cells is 2000 and the number of available cell resources (T300) is 1000 for the gNB-CU 102, the gNB-CU 102 may be a service resource that can receive 1000 transferred cells.

For example, if it is necessary to restore 1200 cells due to a failure occurring in a state where the number of cells of the gNB-CU 102 in service operation is 1200, the service may be resumed through relocation to a gNB-CU 102 with available cell resources.

Figure 4:
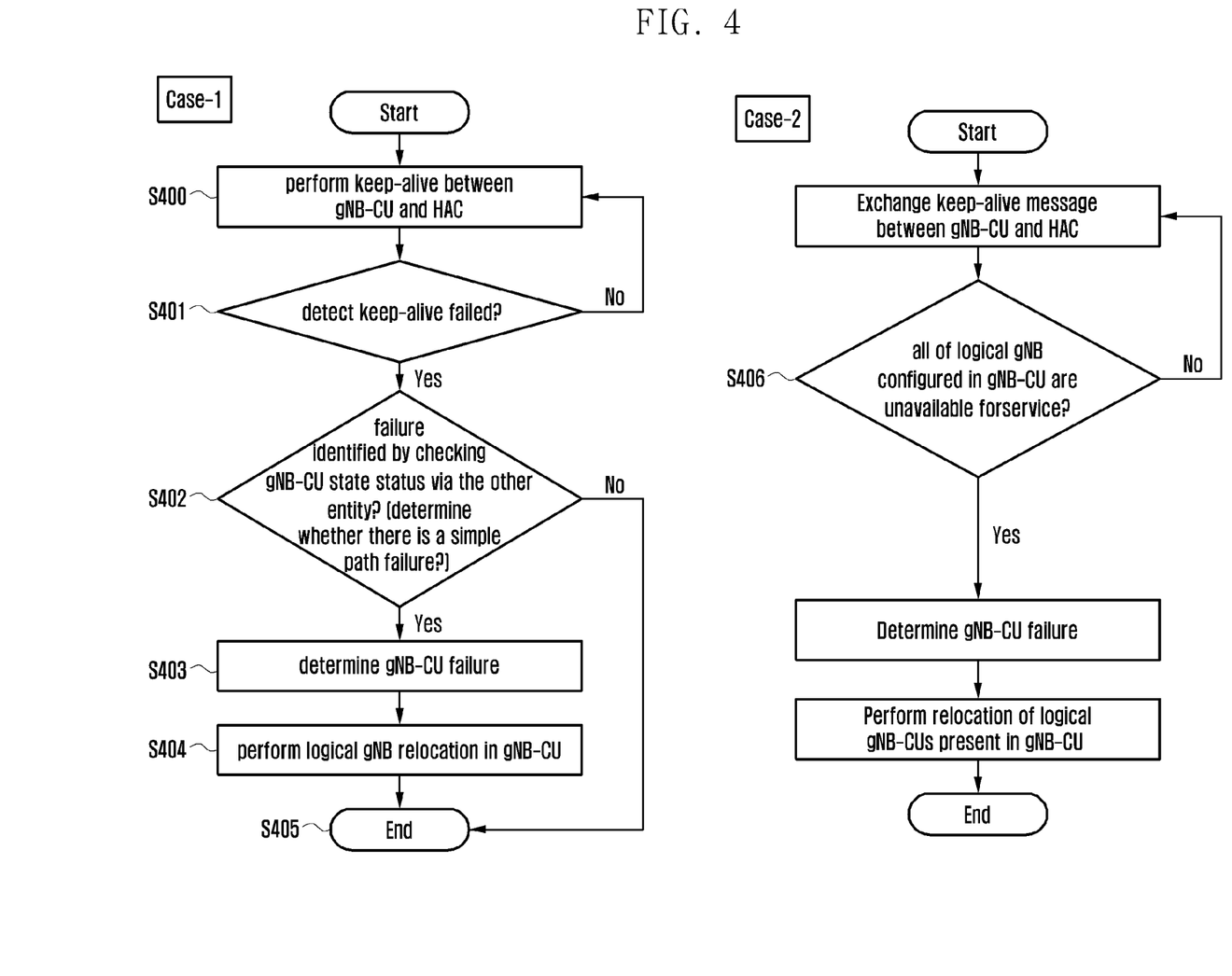
FIG. 4 is a diagram illustrating failure detection of a gNB-CU according to an embodiment of the disclosure.

FIG. 4 is a diagram illustrating a process in which the HAC 100 monitors the states of gNB-CUs 102 to detect a failure based on cases and determines to relocate the logical gNB 103 according to some embodiments.

Specifically, the HAC 100 may manage the current service state of the gNB-CU 102 through a message (e.g., keep-alive message) transmitted from the gNB-CU 102 (S400). Here, if the transmission of the keep-alive message (S400) fails a number of times for a given period of time, a keep-alive failure is detected (S401), and whether the corresponding connection failure state is a simple path failure or an actual failure of the gNB-CU 102 may be checked through another entity interworking with the gNB-CU 102 (S402).

Then, the HAC 100 determines a failure of the gNB-CU 102 (S403), performs relocation of logical gNBs to a gNB-CU 102 in the HA cluster group (S404), and ends the process (S405).

In addition, if the service in the gNB-CU 102 is unavailable and recovery is required in a situation where keep-alive is normal, the service state of the logical gNB received through the keep-alive message may be checked (S406).

Through this process, the failure of the gNB-CU 102 may be determined (S403), the logical gNB 103 may be relocated to an adjacent gNB-CU 102 (S404), and then the process may be ended (S405).

Figure 5:
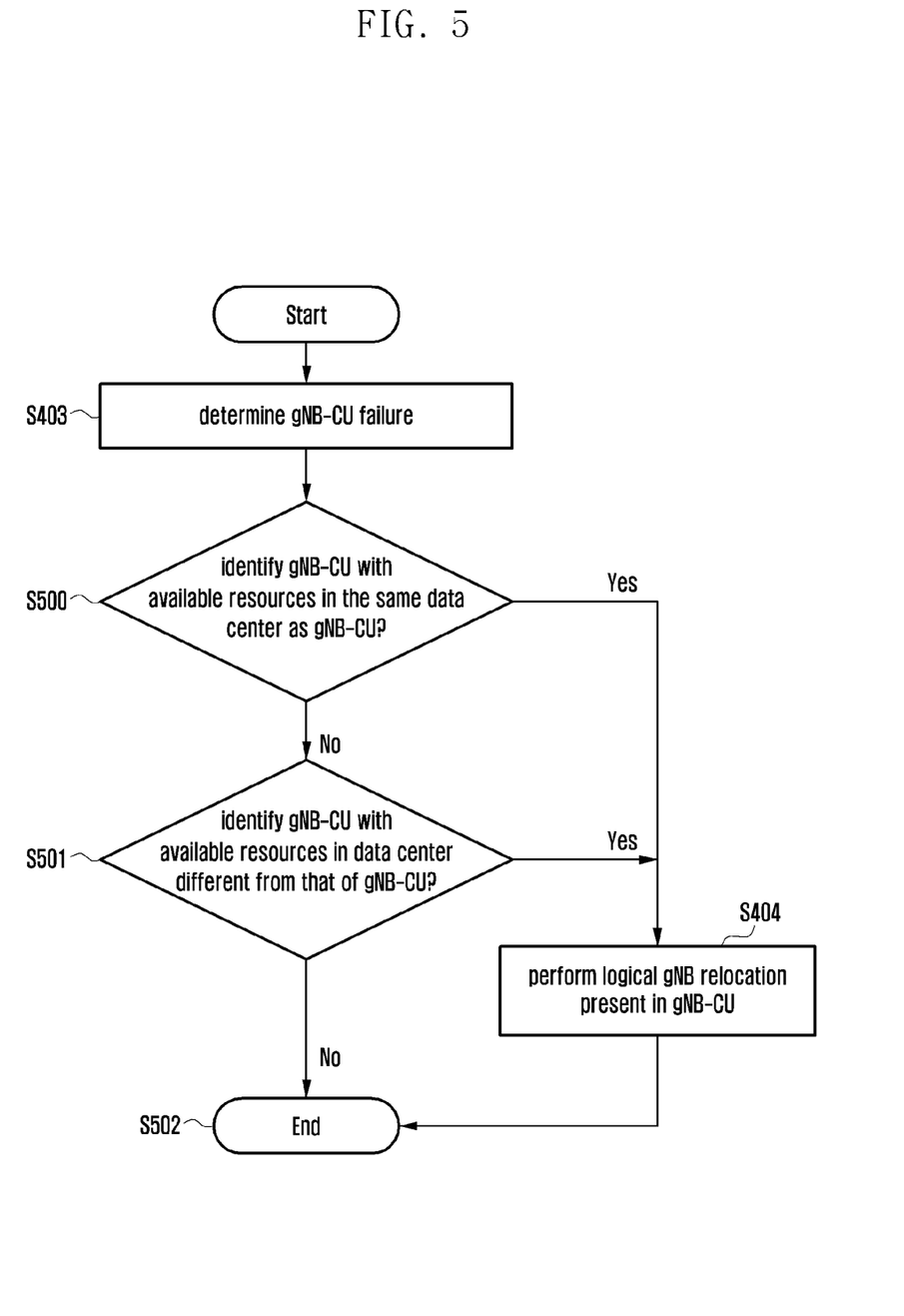
FIG. 5 is a diagram illustrating a recovery target selection algorithm according to an embodiment of the disclosure.

FIG. 5 is a diagram illustrating an algorithm for selecting a gNB-CU 102 for recovery after determination of a failure of a gNB-CU 102 (S403) according to some embodiments.

Specifically, when a gNB-CU 102 is determined as a failure (S403), the HAC 100 may select a gNB-CU 102 that is arranged in the same data center 101 as the failed gNB-CU 102 as a gNB-CU 102 to which the logical gNB 103 is to be relocated for recovery. As described above, if the HAC 100 selects a gNB-CU 102 that is arranged in the same data center 101 as the failed gNB-CU 102 for recovery, the CU-DU latency can be reduced.

Hence, the HAC 100 may monitor the status of cell resources of gNB-CUs 102 arranged in the same data center 101; when a failed gNB-CU 102 is found as a result of monitoring, the HAC 100 may select a gNB-CU 102 that can accommodate the cells of the corresponding gNB-CU 102 (S500), and allow logical gNBs 103 to be relocated (S404).

If there is no gNB-CU 102 with available cell resources in the same data center 101, a gNB-CU 102 in an adjacent data center 101 may be selected (S501), and logical gNBs 103 may be relocated (S404).

Therefore, the HAC 100 may have to monitor cell resources of gNB-CUs 102 of all data centers 101 configured as a HA cluster, and may enable relocation of logical gNBs 103 to any gNB-CU 102 within the cluster.

Figure 6:
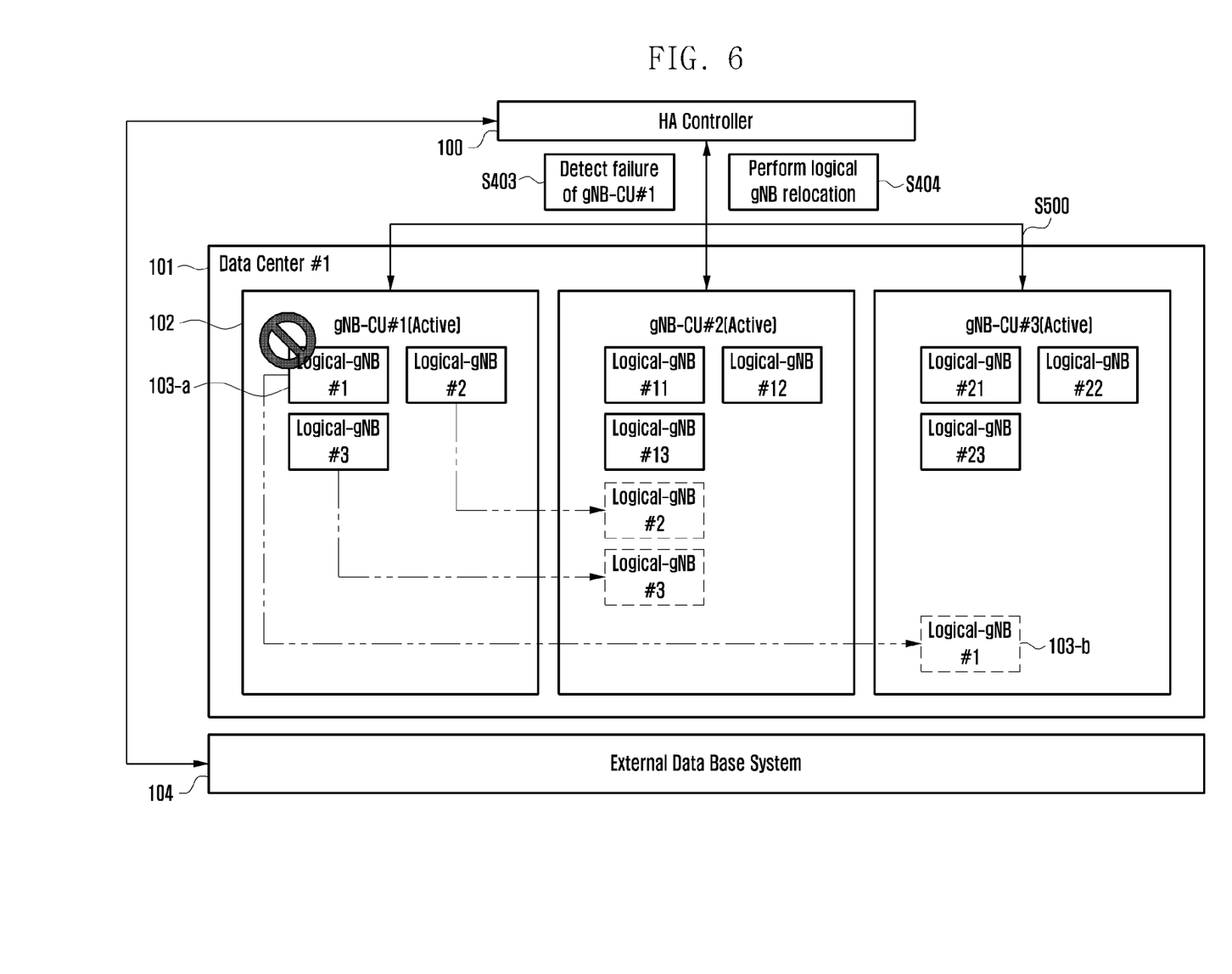
FIG. 6 is a diagram illustrating intra-data-center relocation of logical gNBs in case of a single gNB-CU failure according to an embodiment of the disclosure.

FIG. 6 is a diagram illustrating intra-data-center relocation of logical gNBs in case of a single gNB-CU failure according to an embodiment of the disclosure.

FIG. 6 is a diagram depicting a process of selecting a recovery target first within the data center 101 and performing intra-data-center relocation of logical gNBs 103 according to the algorithm shown in FIG. 5.

Specifically, when a failure occurs in a gNB-CU 102, the HAC 100 detects the failure in the gNB-CU 102 and allows logical gNBs 103-*a* of the corresponding gNB-CU 102 to be distributed and relocated to adjacent gNB-CUs 102 with available cell resources for accommodation within the same data center 010.

The distributed and relocated logical gNBs 103-*b* resume their services by using the previously operated data through the external database system 104.

Figure 7:
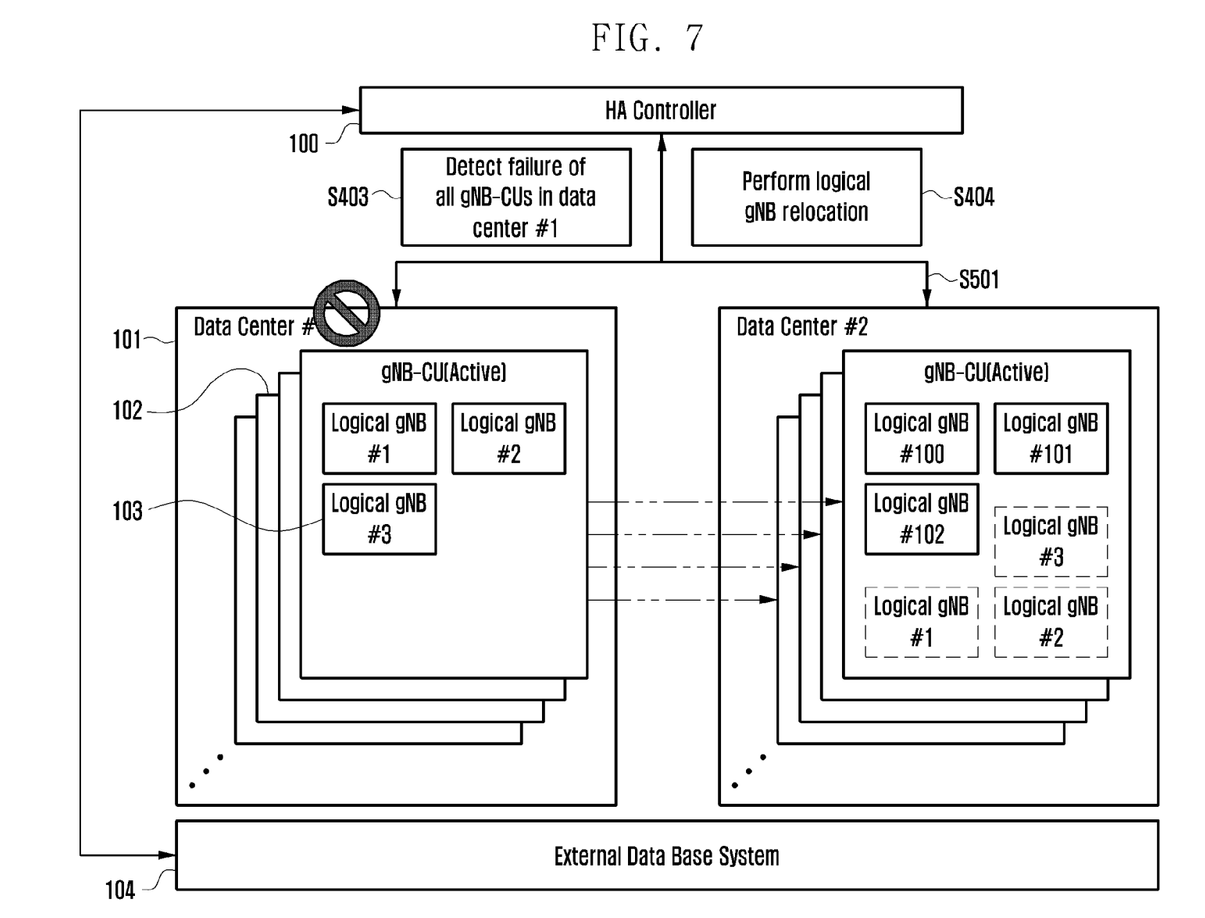
FIG. 7 is a diagram illustrating inter-data-center relocation of logical gNBs in case of a large-scale gNB-CU failure according to an embodiment of the disclosure.

FIG. 7 is a diagram illustrating inter-data-center relocation of logical gNBs in case of a large-scale gNB-CU failure according to an embodiment of the disclosure.

FIG. 7 is a diagram depicting a process of performing inter-data-center relocation of logical gNBs 103 by expanding the recovery target to data centers when a gNB-CU 102 with available cell resources for accommodation is not identified within the data center as a first intra-data-center recovery target according to the process shown in FIG. 6 or when an entire data center goes out of operation.

Specifically, in the former case, when a failure occurs in a gNB-CU 102, the HAC may identify a gNB-CU 102 capable of cell resource accommodation belonging to the same data center as the corresponding gNB-CU 102; if such a gNB-CU 102 with available resources is not identified, the HAC may expand the recovery target to adjacent data centers (inter data centers) to identify gNB-CUs 102 capable of cell accommodation. When relocation of logical gNBs to the gNB-CUs 102 of an adjacent data center is completed, the existing data is fetched from the external database system 104 to resume the service.

In the latter case, when a data center becomes inoperable due to an earthquake or a large-scale power outage, the HAC may detect the disaster and allow logical gNBs 103 of gNB-CUs 102 operating in the data center to be distributed and relocated to an adjacent data center (inter-data-center relocation).

The distributed and relocated logical gNBs 103 are allowed to fetch existing data from the external database system 104 to resume their services.

Figure 8:
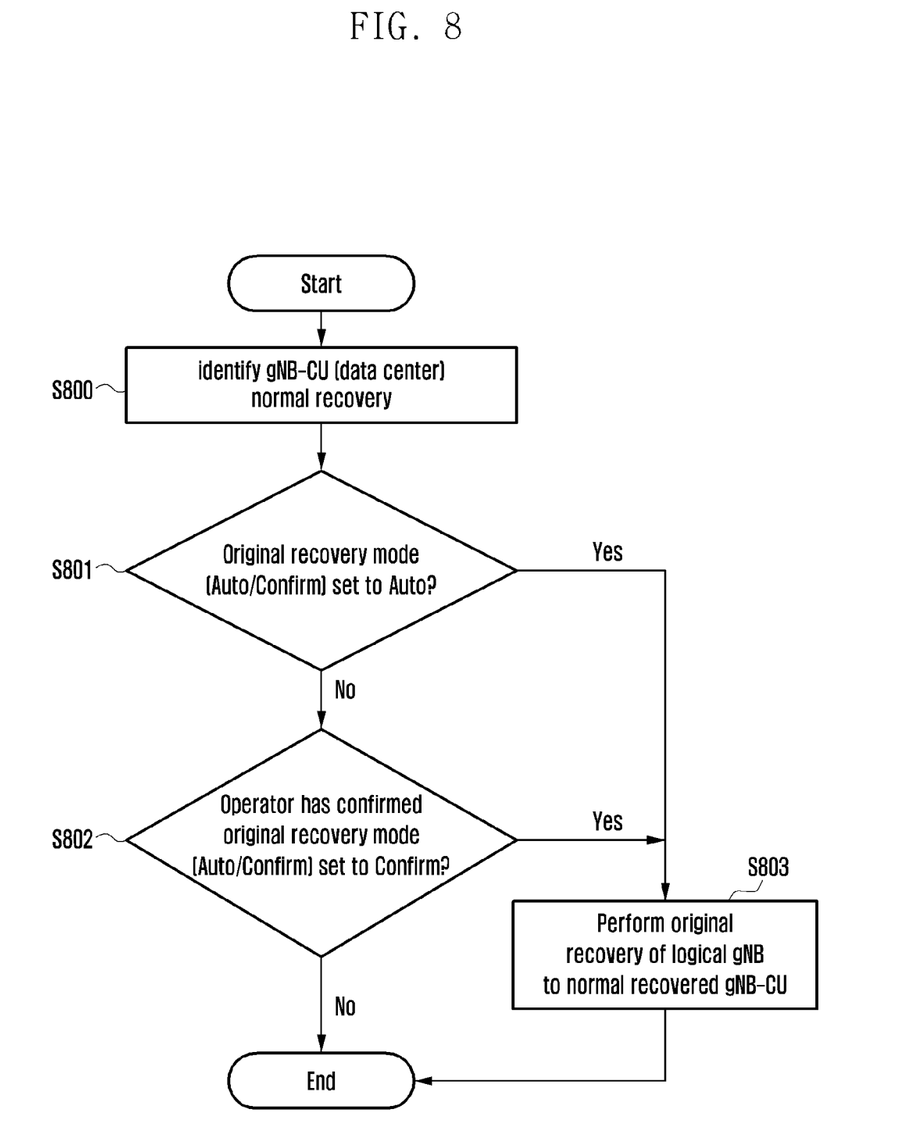
FIG. 8 is a diagram illustrating an algorithm for original recovery in response to gNB-CU's return to normality according to an embodiment of the disclosure.

FIG. 8 is a diagram illustrating an algorithm for original recovery in response to gNB-CU's return to normality according to an embodiment of the disclosure.

FIG. 8 is a diagram illustrating an algorithm for original recovery to the gNB-CU 102 that was in operation before the failure occurrence after the gNB-CU 102 or data center is successfully recovered (S800) according to some embodiments.

Specifically, when the gNB-CU 102 is restored to normal (S800), the HAC detects the normal restoration; if original recovery mode (AUTO/CONFIRM) is set to AUTO (S801), the HAC may automatically relocate the logical gNBs 103 to the gNB-CU 102 that was originally operated (S803). If original recovery mode is set to CONFIRM (S801), when the operator selects CONFIRM, the logical gNBs 103 may be relocated to the gNB-CU 102 that was originally operated (S803). If the operator does not select CONFIRM when original recovery mode is set to CONFIRM (S802), it is possible to continue the service by using the currently operating gNB-CU 102.

Figure 9:
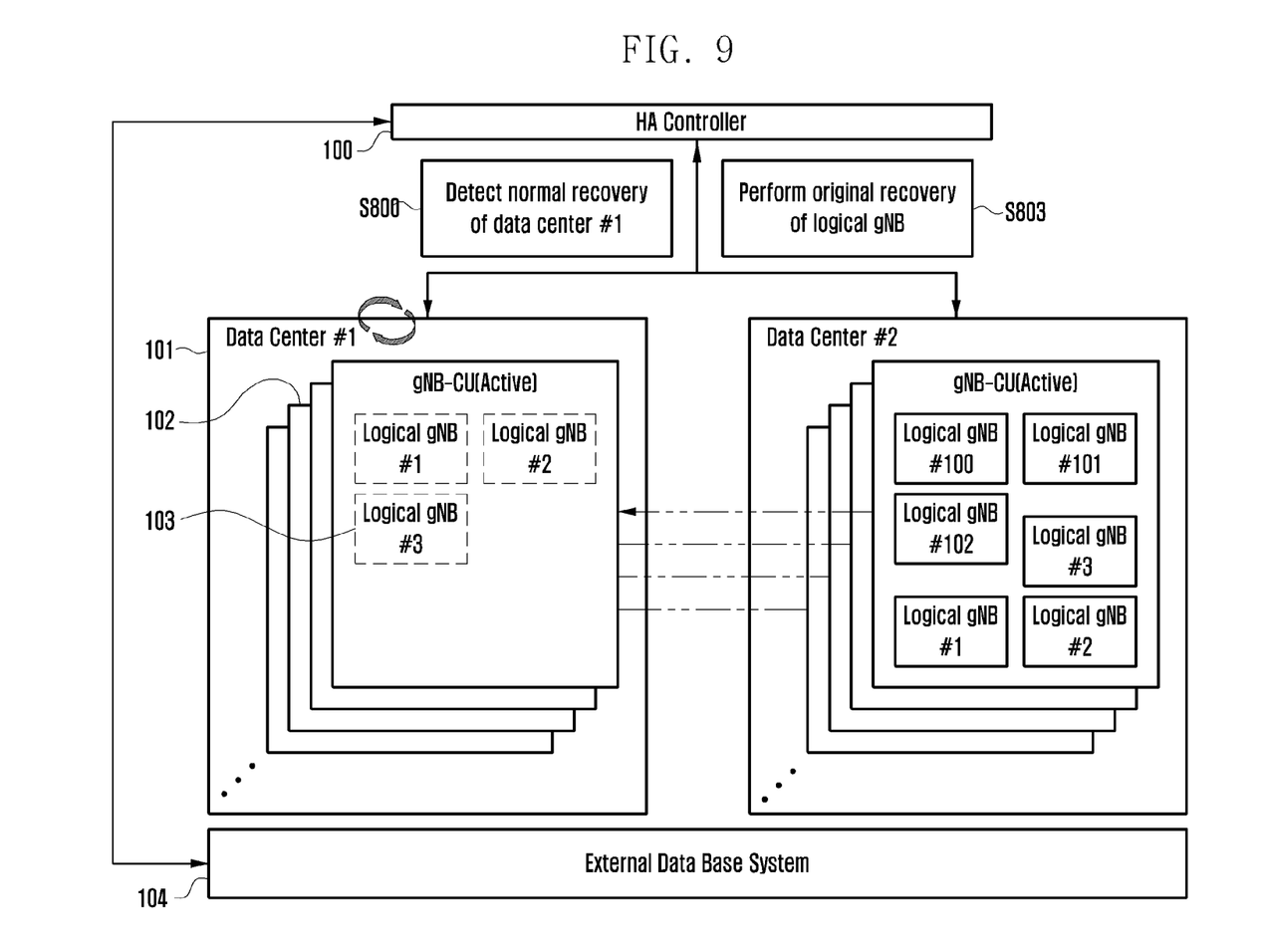
FIG. 9 is a diagram illustrating relocation of logical gNBs for original recovery in response to gNB-CU's return to normality according to an embodiment of the disclosure.

FIG. 9 is a diagram illustrating relocation of logical gNBs for original recovery in response to gNB-CU's return to normality according to an embodiment of the disclosure.

Specifically, in FIG. 9, in a state where a failure has occurred in a gNB-CU 102 and corresponding logical gNBs 103 are in service operation after being distributed and relocated to adjacent gNB-CUs 102 or data center according to the process shown in FIGS. 6 and 7, when the failed gNB-CU 102 is restored to a normally operable state, the HAC may detect the normalization and relocate the logical gNBs 103 in service that are being distributed and relocated back to the gNB-CU 102 where they were originally operated, in which case operational convenience can be improved.

Figure 10:
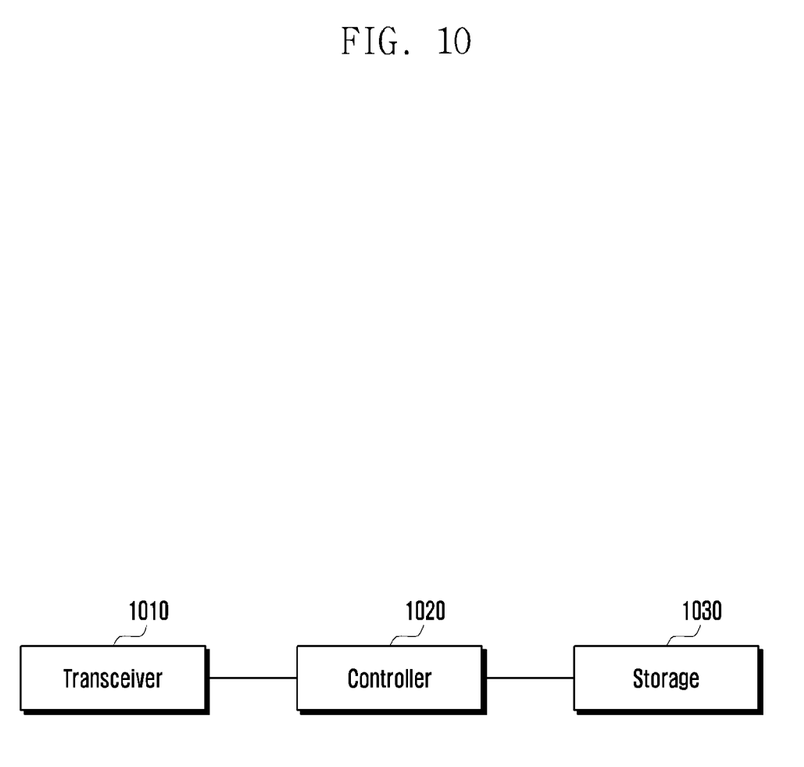
FIG. 10 is a diagram illustrating the structure of a device for managing a high availability service according to an embodiment of the disclosure.

FIG. 10 is a diagram illustrating the structure of a device for managing a high availability service according to an embodiment of the disclosure.

With reference to FIG. 10, the high availability service management device may include a transceiver 1010, a controller 1020, and a storage 1030. In the disclosure, the controller may be defined as a circuit, an application-specific integrated circuit, or at least one processor.

The transceiver 1010 may transmit and receive signals to and from other network entities. The transceiver 1010 may receive system information from, for example, a base station, and may receive a synchronization signal or a reference signal.

The controller 1020 may control the overall operation of the high availability service management device according to embodiments proposed in the disclosure. For example, the controller 1020 may control signal flows between blocks to perform operations according to the above-described flowcharts. Specifically, the controller 1020 may control operations proposed in the present disclosure to receive remaining minimum system information (RMSI) in a multi-beam based system according to an embodiment of the disclosure.

The storage 1030 may store at least one of information transmitted and received through the transceiver 1010 or information generated through the controller 1020. For example, the storage 1030 may store scheduling information related to RMSI transmission, RMSI related PDCCH time axis position and periodicity information, and the like.

Figure 11:
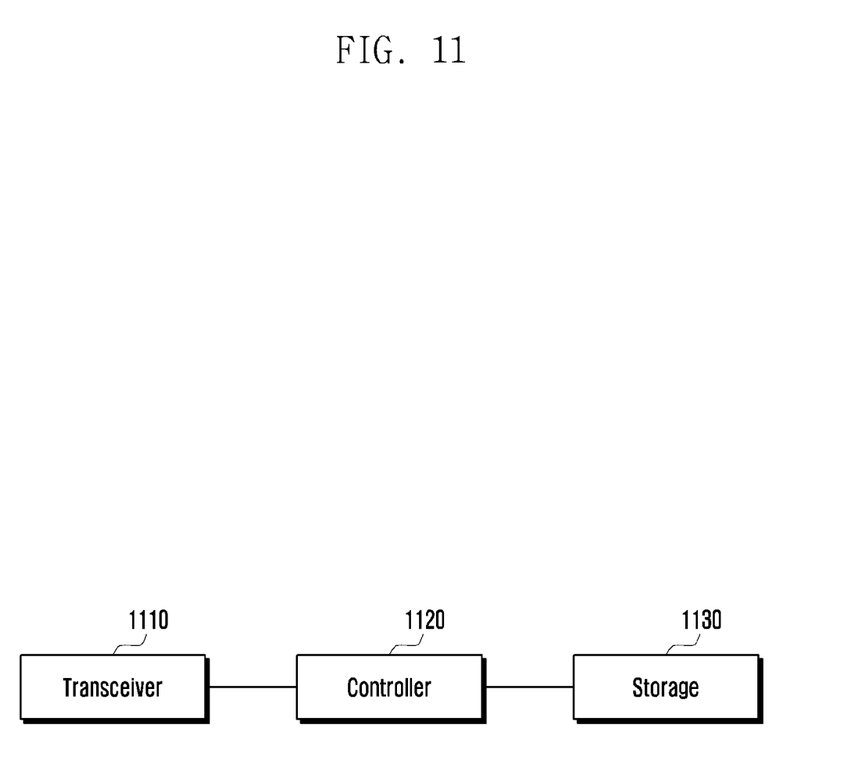
FIG. 11 is a diagram illustrating the structure of a base station according to an embodiment of the disclosure.

FIG. 11 is a diagram illustrating the structure of a base station according to an embodiment of the disclosure.

With reference to FIG. 11, the base station may include a transceiver 1110, a controller 1120, and a storage 1130. In the disclosure, the controller may be defined as a circuit, an application-specific integrated circuit, or at least one processor.

The transceiver 1110 may transmit and receive signals to and from other network entities. The transceiver 1110 may transmit system information to, for example, a terminal, and may transmit a synchronization signal or a reference signal.

The controller 1120 may control the overall operation of the base station according to embodiments proposed in the disclosure. For example, the controller 1120 may control signal flows between blocks to perform operations according to the above-described flowcharts. Specifically, the controller 1120 may control operations proposed in the present disclosure to transmit remaining minimum system information (RMSI) in a multi-beam based system according to an embodiment of the disclosure.

The storage 1130 may store at least one of information transmitted and received through the transceiver 1110 or information generated through the controller 1120. For example, the storage 1130 may store scheduling information related to RMSI transmission, RMSI related PDCCH time axis position and periodicity information, and the like.

Reference symbols have been provided in the exemplary embodiments shown in the drawings to facilitate understanding of the disclosure, particular terms have been used to describe the embodiments of the disclosure but the disclosure is not limited by the particular terms, and the disclosure may include all elements that can be generally conceived by those of ordinary skill in the art.

The disclosure may be represented in terms of functional blocks and various processing steps. Such functional blocks may be implemented with a varying number of hardware and/or software components that carry out specific functions.

Just as the components of the disclosure may be carried out by software programming or software elements, the disclosure may be implemented with programming or scripting languages such as C, C++, Java, and assembler together with various algorithms represented by a combination of data structures, processes, routines, or other programming elements. Functional aspects may be implemented by algorithms that are executed on one or more processors. Also, the disclosure may employ related-art techniques for electronic environment setting, signal processing, and/or data processing.

The use of terms "a", "an", and "the" and similar referents in the specification of the disclosure (especially in the claims) are to be construed to cover both singular and plural expressions. Furthermore, when a range is described in the disclosure, it includes inventions to which individual values belonging to the range are applied (unless otherwise indicated herein) and is the same as describing each individual value constituting the range in the detailed description of the invention. Finally, the steps constituting a method of the disclosure may be performed in an appropriate order unless the order is clearly stated or stated otherwise. The disclosure is not necessarily limited to the order in which the steps are listed. The use of any and all examples, or exemplary terms (e.g., "such as") provided herein, is intended merely to clearly describe the disclosure and does not pose a limitation on the scope of the disclosure unless limited by the claims. In addition, it should be understood by those skilled in the art that many variations, combinations and modifications based on design conditions and factors will still fall within the scope of the disclosure as defined in the appended claims and their equivalents.

The invention claimed is:

1. A method performed by a high availability service management device in a wireless communication system, the method comprising:
   receiving, from a first gNodeB central unit (gNB-CU), in a first data center, a keep-alive message associated with available cell resources, wherein the keep-alive message includes logical gNB information, a number of operated cells, and a on service operation state;
   in case that a reception of the keep-alive message fails a number of times for a given period of time, determining that a keep-alive message_failure has occurred;

identifying whether the keep-alive message failure is a simple path failure or an actual failure of the first gNB-CU via another entity interworking with the first gNB-CU;

based on the identification, determining a failure of the first gNB-CU in the first data center;

identifying whether there are available cell resources in the first data center;

in case that there are available cell resources in the first data center, relocating at least one logical-gNB in the first gNB-CU to a second gNB-CU in the first data center; and in case that there are no available cell resources in the first data center, relocating at least one logical-gNB in the first gNB-CU to a third gNB-CU in a second data center, wherein the second data center is different from the first data center, wherein the at least one logical-gNB included in the first gNB-CU performs at least one function performed by the first gNB-CU, and wherein the first gNB-CU, the second gNB-CU, and the third gNB-CU are in an active status.

2. The method of claim 1, further comprising:

identifying whether the first gNB-CU has been recovered from the failure of the first gNB-CU; and in case that the first gNB-CU has been recovered from the failure of the first gNB-CU, relocating the at least one logical-gNB in the at least one of the second gNB-CU or the third gNB-CU back to the first gNB-CU based on a configured recovery mode between an automatic recovery mode and a confirmation recovery mode, wherein in case that the configured recovery mode is the automatic recovery mode, the at least one logical-gNB is relocated to the first gNB-CU without confirmation, and wherein in case that the configured recovery mode is the confirmation recovery mode, the at least one logical-gNB is relocated to the first gNB-CU with confirmation.

3. The method of claim 1, further comprising prior to receiving the keep-alive message:

receiving, from the first gNB-CU, a high availability service management device registration request message for configuring the high availability service management device as a management target; and transmitting, to the first gNB-CU, a high availability service management device registration response message, based on the high availability service management device registration request.

4. A method performed by a first gNodeB central unit (gNB-CU), in a first data center in a wireless communication system, the method comprising:

generating, a keep-alive message associated with available cell resources, wherein the keep-alive message includes logical gNB information, a number of operated cells, and a service operation state; and transmitting, to a high availability service management device, the keep-alive message, wherein in case that a transmission of the keep-alive message fails a number of times for a given period of time, a keep-alive message failure is determined, wherein whether the keep-alive message failure is a simple path failure or an actual failure of the first gNB-CU is identified via another entity interworking with the first gNB-CU, wherein a failure of the first gNB-CU in the first data center is determined based on the identification, wherein in case that there are available cell resources in the first data center, at least one logical-gNB in the first gNB-CU is relocated to a second gNB-CU in the first data center, wherein in case that there are no available cell resources in the first data center, at least one logical-gNB in the first gNB-CU is relocated to a third gNB-CU in a second data center, wherein the second data center is different from the first data center, wherein the at least one logical-gNB included in the first gNB-CU performs at least one function performed by the first gNB-CU, and wherein the first gNB-CU, the second gNB-CU, and the third gNB-CU are in an active status.

5. The method of claim 4, further comprising prior to transmitting the keep-alive message:

transmitting, to the high availability service management device, a high availability service management device registration request message for configuring the high availability service management device as a management target; and receiving, from high availability service management device, a high availability service management device registration response message, based on the high availability service management device registration request.

6. A high availability service management device in a wireless communication system, the high availability service management device comprising:

a transceiver; and a controller configured to:

receive, from a first gNodeB central unit (gNB-CU), in a first data center, a keep-alive message associated with available cell resources, wherein the keep-alive message includes logical gNB information, a number of operated cells, and a service operation state, in case that a reception of the keep-alive message fails a number of times for a given period of time, determining that a keep-alive message failure has occurred, identifying whether the keep-alive message failure is a simple path failure or an actual failure of the first gNB-CU via another entity interworking with the first gNB-CU, based on the identification, determining a failure of the first gNB-CU in the first data center, identifying whether there are available cell resources in the first data center, in case that there are available cell resources in the first data center, relocating at least one logical-gNB in the first gNB-CU to a second gNB-CU in the first data center, and in case that there are no available cell resources in the first data center, relocating at least one logical-gNB in the first gNB-CU to a third gNB-CU in a second data center, wherein the second data center is different from the first data center, wherein the at least one logical-gNB included in the first gNB-CU performs at least one function performed by the first gNB-CU, and wherein the first gNB-CU, the second gNB-CU, and the third gNB-CU are in an active status.

7. The high availability service management device of claim 6, wherein the controller is further configured to:
- identify whether the first gNB-CU has been recovered from the failure of the first gNB-CU, and
- in case that the first gNB-CU has been recovered from the failure of the first gNB-CU, relocate the at least one logical-gNB in the at least one of the second gNB-CU or the third gNB-CU back to the first gNB-CU based on a configured recovery mode between an automatic recovery mode and a confirmation recovery mode,
- wherein in case that the configured recovery mode is the automatic recovery mode, the at least one logical-gNB is relocated to the first gNB-CU without confirmation, and
- wherein in case that the configured recovery mode is the confirmation recovery mode, the at least one logical-gNB is relocated to the first gNB-CU with confirmation.

8. The high availability service management device of claim 6, wherein the controller is further configured to:
- receive, from the first gNB-CU, a high availability service management device registration request message for configuring the high availability service management device as a management target, and
- transmit, to the first gNB-CU, a high availability service management device registration response message, based on the high availability service management device registration request.

9. A first gNodeB central unit (gNB-CU) in a first data center in a wireless communication system, the first gNB-CU comprising:
- a transceiver; and
- a controller configured to:
  - generate, a keep-alive message associated with available cell resources, wherein the keep-alive message includes logical gNB information, a number of operated cells, and a service operation state, and
  - transmit, to a high availability service management device, the keep-alive message,
- wherein in case that a transmission of the keep-alive message fails a number of times for a given period of time, a keep-alive message failure is determined,
- wherein whether the keep-alive message failure is a simple path failure or an actual failure of the first gNB-CU is identified via another entity interworking with the first gNB-CU,
- wherein a failure of the first gNB-CU in the first data center is determined based on the identification,
- wherein in case that there are available cell resources in the first data center, at least one logical-gNB in the first gNB-CU are relocated to a second gNB-CU in the first data center,
- wherein in case that there is no available cell resources in the first data center, at least one logical-gNB in the first gNB-CU is relocated to a third gNB-CU in a second data center,
- wherein the second data center is different from the first data center,
- wherein the at least one logical-gNB included in the first gNB-CU performs at least one function performed by the first gNB-CU, and
- wherein the first gNB-CU, the second gNB-CU, and the third gNB-CU are in an active status.

10. The first gNB-CU of claim 9, wherein the controller is further configured to:
- transmit, to the high availability service management device, a high availability service management device registration request message for configuring the high availability service management device as a management target, and
- receive, rom high availability service management device, a high availability service management device registration response message, based on the high availability service management device registration request.

* * * * *